United States Patent

Kawamura

Patent Number: 5,136,321
Date of Patent: Aug. 4, 1992

[54] PHOTOGRAPHIC CAMERA

[75] Inventor: Kazuteru Kawamura, Hino, Japan

[73] Assignee: Olympus Optical Co., Ltd., Tokyo, Japan

[21] Appl. No.: 726,207

[22] Filed: Jul. 5, 1991

[30] Foreign Application Priority Data

Jul. 9, 1990 [JP] Japan .................. 2-181274

[51] Int. Cl.⁵ .............................. G03B 13/06
[52] U.S. Cl. .................................. 354/225
[58] Field of Search ............ 354/219, 224, 225

[56] References Cited

U.S. PATENT DOCUMENTS 4,926,201  5/1990  Mukui et al. ............. 354/219
4,941,012  7/1990  Inabata ................... 354/478

FOREIGN PATENT DOCUMENTS 63-226616  9/1988  Japan .
1-309019  12/1989  Japan .

*Primary Examiner*—Michael L. Gellner
*Attorney, Agent, or Firm*—Cushman, Darby & Cushman

[57] ABSTRACT

A photographic camera has a photographing objective optical system forming an image of an object on a film, a cartridge chamber, a spool chamber, and an eye-level real image mode finder including a finder objective optical system having an optical axis different from that of the photographing objective optical system, arranged so that the cartridge chamber is located on the extension of the optical axis of the finder objective optical system, a reflecting member erecting an image formed by the finder objective optical system, arranged so that the optical axis passes over the cartridge chamber, and an eyepiece arranged on the above optical axis. Thus, the photographic camera has practically important advantages of being provided with the finder which is small in size, low in cost, and very easy of view.

8 Claims, 3 Drawing Sheets $h_2 < h_1 < h_3$ $h_2 < h_1 < h_3$ $h_2 < h_3 < h_1$

PHOTOGRAPHIC CAMERA

BACKGROUND OF THE INVENTION a) Field of the Invention

This invention relates to a photographic camera.

b) Description of the Prior Art

A finder in which a photographing system is arranged apart from a finder system is available in virtual and real image modes. In recent years, the real image mode finder which provides a good view of the visual field has come to be used in numerous cases.

The real image mode finder needs a means for erecting an image and the point of compaction of a camera is how this image erecting means is effectively arranged in the body of the camera in view of its space. In general, Porro prisms and pentagonal roof prisms are known as the image erecting means of compact designs.

The real image mode finder making use of the Porro prism is set forth, for instance, in Japanese Patent Preliminary Publication No. Sho 63-226616, which has such an arrangement as shown in FIG. 1. Specifically, a ray I passing through a finder objective lens 1 is incident at an entrance surface $A_1$ of a Porro prism 2 on the Porro prism 2 and bent downward, as a ray II, by a reflecting surface $B_1$. The ray II is laterally bent by a reflecting surface $C_1$ into a ray III. By a reflecting surface $D_1$, the ray III is turned upward into a ray IV, which is bent rearward, as a ray V, by a reflecting surface $E_1$. The ray V emerges at an exit surface $F_1$ from the Porro prism 2, traverses an eyepiece 3 arranged directly behind the Porro prism 2, arrives at a pupil, and is observed as an orthographic image.

The real image mode finder making use of the pentagonal roof prism is set forth, for example, in Japanese Patent Preliminary Publication No. Hei 1-309019, which has such an arrangement as shown in FIG. 2. Specifically, the ray I passing through the finder objective lens 1 is laterally bent by reflecting surfaces $A_2$ and $A_2'$ of a Dach mirror 4 into the ray II. After forming an image of an object at a plane $B_2$ disposed between the Dach mirror 4 and a pentagonal roof prism 5, the ray II enters the pentagonal roof prism 5 from an entrance surface $C_2$ and is obliquely turned forward, as the ray III, by a reflecting surface $D_2$. The ray III is bent rearward by a reflecting surface $E_2$, coming to the ray IV. Finally, the ray IV emerges at an exit surface $F_2$ from the pentagonal roof prism 5, traverses the eyepiece 3 arranged directly behind the pentagonal roof prism 5, arrives at the pupil, and is observed as the orthographic image.

Consideration is now given as to the case where the finders of the prior art mentioned above are arranged in the camera bodies. In the finder using the Porro prism as the image erecting means, the eyepiece 3 is placed directly behind a cartridge chamber of the camera, so that the Porro prism 2 lying directly before the eyepiece 3 is inevitably arranged, for example, as depicted in FIG. 3, directly above a cartridge chamber 6. Hence, the height of the camera involves at least the addition of the height of the Porro prism 2 to that of the cartridge chamber 6. Also, in order to reduce the height, the arrangement is proposed such that, for example, as shown in FIG. 4, the lower portion of the Porro prism 2 is embedded in the camera body between the cartridge chamber 6 and a photographic lens barrel 7. In this case, the Porro prism 2 is positioned to prevent the interference with the cartridge chamber 6, with the result that the width of the camera increases. Furthermore, in the case of either FIG. 3 or 4, the optical axis of incidence lies outside the cartridge chamber 6, that is, the relationship of $h_2 < h_1 < h_3$ is brought about. Thus, in such a camera, there is a limit to the reduction of the height at the plane of incidence of the finder and the compaction cannot be expected.

As in the foregoing, the problem is encountered that the arrangement including such a Porro prism used in general has great restriction in view of the compact design of the camera body.

In the case where the pentagonal roof prism is used as the image erecting means, on the other hand, the height of the finder is about half that of the Porro prism type, but its width is needed 1.5 to 2 times that of the Porro prism type. Consequently, as shown in FIG. 5, when the prism 5 is arranged above the cartridge chamber 6 as in FIG. 3, the width of the camera body increases due to the finder.

Also, when the pentagonal roof prism 5 is disposed directly above the photographic lens barrel 7 as depicted in FIG. 6, the width does not increase, while the height is increased by the photographic lens barrel 7 and as such the effect of the compact design of the camera which may be secured by the use of the pentagonal roof prism 5 is made to diminish. Further, in the case of either FIG. 5 or 6, the optical axis of incidence lies outside the cartridge chamber 6, that is, the relationship of $h_2 < h_1 < h_3$ is brought about. Thus, in such a camera, there is a limit to the reduction of the height at the plane of incidence of the finder and the compaction cannot be expected. Moreover, instead of two surfaces of the Porro prism, the Dach mirror 4 with considerably high angle accuracy must be used with the resultant great rise in cost.

Thus, the arrangement making use of the pentagonal roof prism has problems that the effect of the compact design of the camera is diminished and the cost is made very high.

SUMMARY OF THE INVENTION

It is, therefore, the object of the present invention to provide a photographic camera having a finder which is very small in size, low in cost, and very easy of view.

This object is attained, according to the present invention, by providing a photographing objective optical system forming an image of an object on a film, a cartridge chamber for housing a cartridge in which the film is incorporated, a spool chamber for taking up the film, and a real image mode finder including a finder objective optical system having an optical axis different from that of the photographing objective optical system, disposed so that one of the cartridge chamber and the spool chamber is located on the extension of the optical axis of the finder objective optical system, a reflecting member erecting an image formed by the finder objective optical system, and an eyepiece.

Moreover, the photographic camera according to the present invention should desirably satisfy the following conditions for more favorable correction of aberration:

(1) $h_2 < h_1, h_3 < h_1$ (2) $0.8\phi < l < 2\phi$ where $h_1$ is the total length between the ends of the cartridge or the spool chamber, $h_2$ is the distance from the optical axis of incidence to one end of the cartridge chamber or the spool chamber, $h_3$ is the distance from the optical axis of incidence to the other end of the cartridge chamber or the spool chamber, l is the distance from the last reflecting surface of the image inverting member to the eyepiece, and $\phi$ is the diameter of the cartridge chamber.

Unless Condition (1) is satisfied, the compaction of the camera which is the primary object of the present invention cannot be accomplished. If the lower limit of Condition (2) is exceeded, the finder will be very difficult of view since the eyepiece penetrates the distant interior of the camera. Further, exceeding the upper limit of the Condition (2) makes it impossible to secure proper magnification of the finder. To attain the proper magnification of the finder, all diameters (widths) ranging from the entrance surface to the exit surface of the finder section must be made larger. This is undesirable because of the contradiction to the compaction of the camera which is the primary object of the present invention.

This and other objects as well as the features and the advantages of the present invention will become apparent from the following detailed description of the preferred embodiment when taken in conjunction with the accompanying drawings.

DETAILED DESCRIPTION OF THE PREFERRED EMBODIMENT

Figure 1:
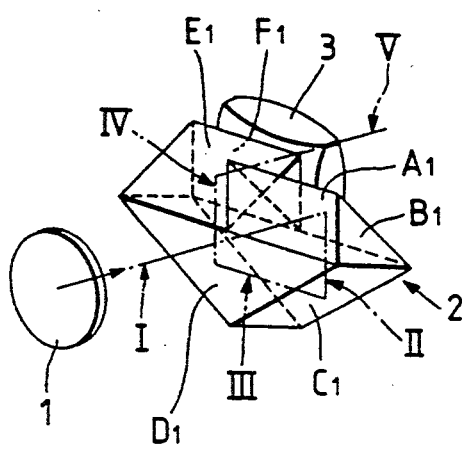
FIGS. 1 and 2 are perspective views of conventional real image mode finders making use of a Porro prism and a pentagonal roof prism, respectively.
Figure 2:
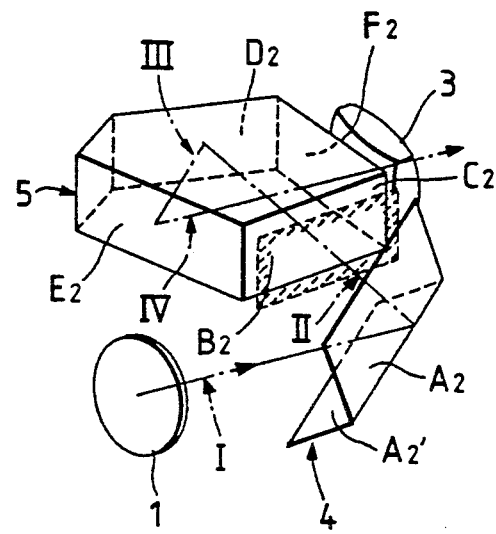
Figure 3:
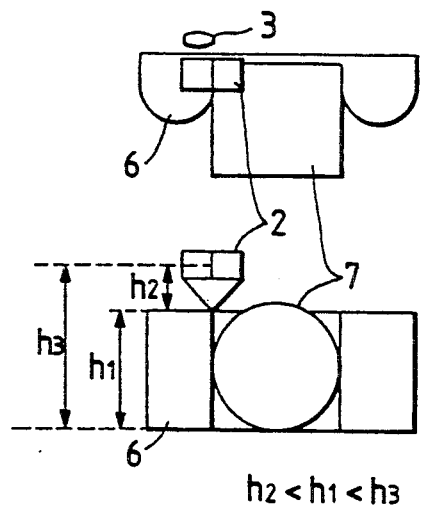
FIGS. 3 and 4 are schematic views of the prior art having the real image mode finder shown in FIG. 1.
Figure 4:
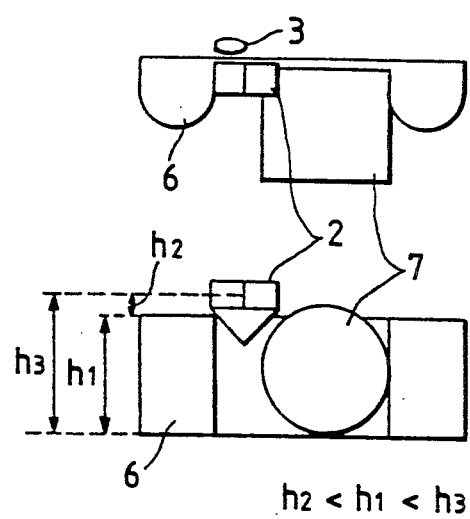
Figure 5:
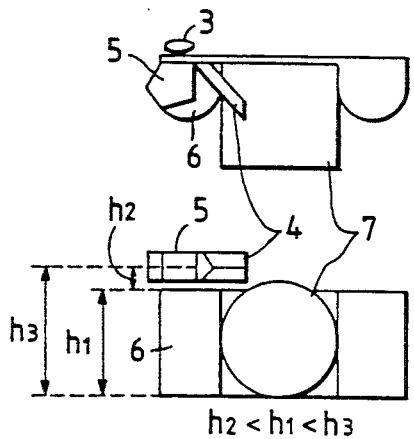
FIGS. 5 and 6 are schematic views of the prior art having the real image mode finder shown in FIG. 2.
Figure 6:
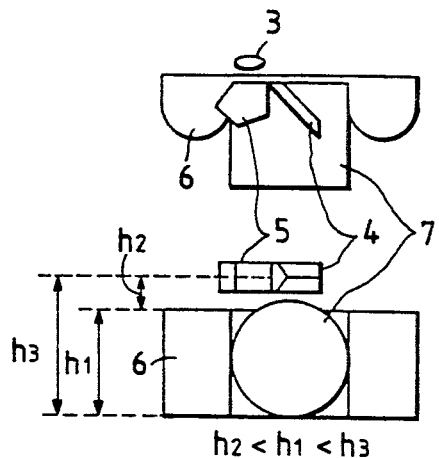

In accordance with the embodiment shown in the drawings, the present invention will be described in detail below.

Figure 7:
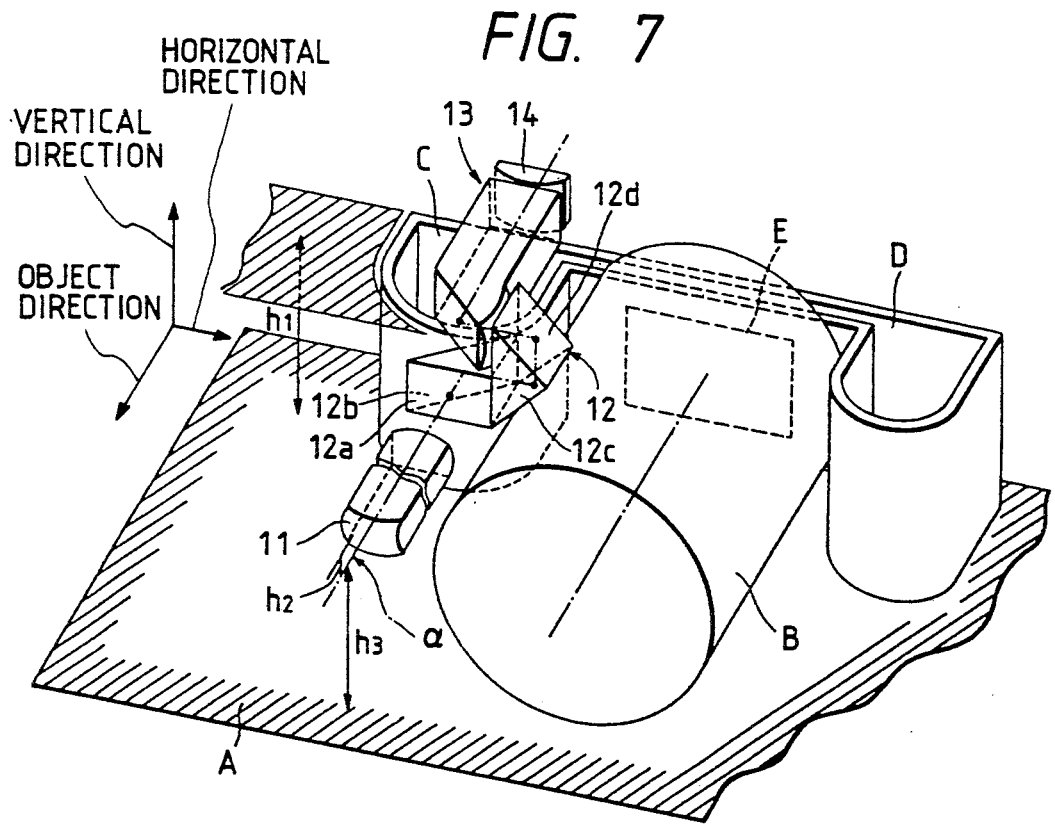
FIG. 7 is a perspective view showing the arrangement of a finder section, a photographic lens barrel, a cartridge chamber, and a spool chamber in one embodiment of a photographic camera according to the present invention.
Figure 8:
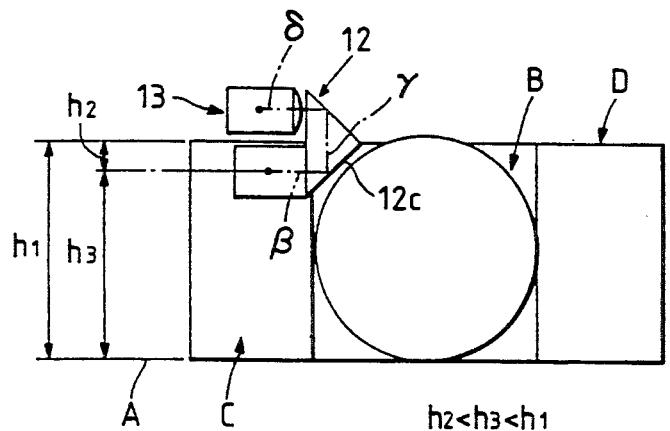
FIGS. 8 and 9 are front and plan views of the embodiment, respectively.
Figure 9:
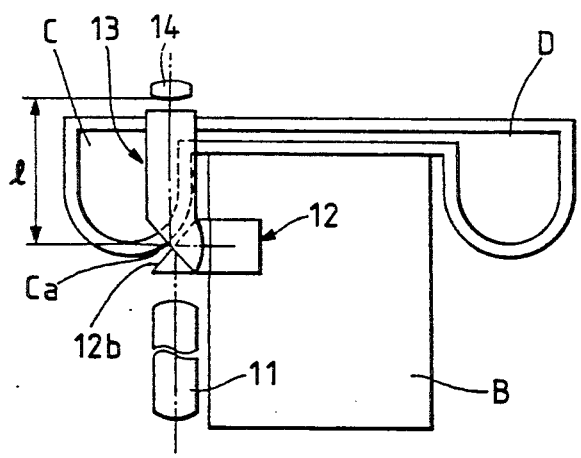
Figure 10:
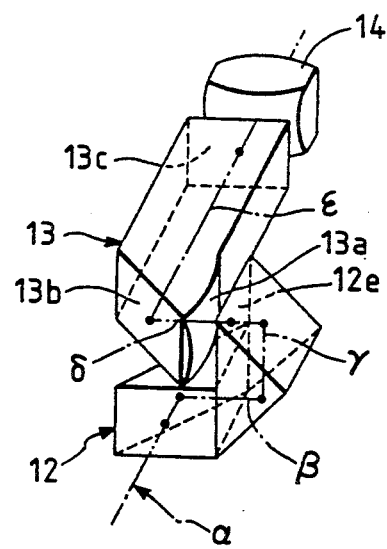
FIG. 10 is a perspective view showing the details of the prisms of the embodiment.

FIG. 7 is a perspective view showing the arrangement of a finder section, a photographic lens barrel, a cartridge chamber, and a spool chamber in one embodiment of a photographic camera according to the present invention, FIGS. 8 and 9 are front and plan views of the embodiment, respectively, and FIG. 10 is a perspective view showing the details of the prisms of the embodiment.

In these figures, reference symbol A represents a bottom reference plane, B a photographic lens barrel housing a photographing objective optical system, C a cartridge chamber housing a cartridge in which a film is incorporated, D a spool chamber for taking up the film, and E a photographic plane (film surface) located, between the cartridge chamber C and the spool chamber D, behind the photographic lens barrel B. Reference numeral 11 denotes a finder objective lens, 12 and 13 prisms, arranged behind the objective lens 11, composing an image inverting optical system which rotates an image formed by the finder objective lens 11, and 14 an eyepiece arranged behind the prism 13, all of which constitute a real image mode finder section.

As shown in FIGS. 7 to 10, a ray $\alpha$ emanating from an object passes through the objective lens 11, is incident at an entrance surface 12a on the prism 12, and is directly reflected laterally from a reflecting surface 12b toward the photographic lens barrel B into a ray $\beta$. At a reflecting surface 12c, the ray $\beta$ is directly above reflected into a ray $\gamma$. Further, the ray $\gamma$ is directly reflected laterally from a reflecting surface 12d, as a ray $\delta$, toward the opposite of the photographic lens barrel B. The ray $\delta$ emerges at an exit surface 12e from the prism 12 and forms an image at a focus position of the objective lens 11. After that, the ray $\delta$ enters the prism 13 from an entrance surface 13a and is reflected rearward from a reflecting surface 13b into a ray $\epsilon$. Finally, the ray $\epsilon$ emerges at an exit surface 13c from the prism 13, reaches a pupil through the eyepiece 14, and is observed as an orthographic image.

Here, when, as noted in FIG. 8, the height from the bottom reference plane A to the optical axis of the ray $\alpha$ incident on the objective lens 11 is denoted by $h_3$ and the height of the cartridge chamber C by $h_1$, $h_3 < h_1$. Further, when the height from the optical axis of the ray $\alpha$ to the top of the cartridge chamber C is denoted by $h_2$, $h_2 < h_1$ as a matter of course.

The reflecting surface 12b of the prism 12, as depicted in FIG. 9, is arranged so as to be put in the space between a periphery Ca of the cartridge chamber C and the photographic lens barrel B. The second reflecting surface 12c of the prism 12, as shown in FIG. 8, is disposed so as to lean on the periphery of the photographic lens barrel B. The prism 13, as shown in FIG. 9, is arranged above the cartridge chamber C so as to cross the camera from the front to the rear. Now, when l is taken as the distance from the first reflecting surface 13b of the prism to the eyepiece 14 and $\phi$ as the diameter of the cartridge chamber C, it is desirable that $0.8\phi < l < 2\phi$. If $l < 0.8\phi$, the eyepiece 14 will penetrate the distant interior of the camera with the resultant finder very difficult of view. If $2\phi < l$, it will be difficult to secure proper magnification of the finder. Although the proper magnification of the finder can be obtained if the focal length of the objective lens 11 is increased, the prisms 12 and 13 become bulky, which eliminates the merit of downsizing the camera.

The photographic camera according to the present invention, as mentioned above, is such that the optical axis of the finder section is bent rightward from the first reflecting surface 12b of the prism 12 in front of the cartridge chamber C which lies on the extension of the optical axis on the incidence side, further bent upward by the second reflecting surface 12c, bent leftward by the third reflecting surface 12d, and eventually introduced into the eyepiece 14 located above the cartridge chamber C through the first reflecting surface 13b of the prism 13. Since the optical path is thus followed such as to climb over the cartridge chamber C, the height of the camera at plane of incidence is considerably reduced and the compaction can be realized in respect of the direction of the height of the camera.

Additionally, the photographic camera according to the present invention is such that the optical axis of incidence of the finder section is shifted from the optical axis of emergence with respect to the direction of the height of the cartridge chamber C (the distance from the camera bottom to the optical axis of incidence < the distance from the camera bottom to the optical axis of emergence), so that the eyepiece 14 is arranged above the cartridge chamber C and an eye point can be disposed at a natural position similar to the conventional camera. As a result, the finder is very easy of view. Further, by fulfilling Condition (2), the proper magnification of the finder can be brought about. Since the finder objective lens 11 is arranged at a position lower than the upper end of the cartridge chamber C, the height of the camera at the plane of incidence can be compactly constructed, for instance, even in the objective lens 11 having a large diameter. Moreover, the arrangement, which fails to use Dach prisms, makes the cost low.

Although, in the embodiment, the finder section is disposed at the upper end of the cartridge chamber C, it may be at the lower end and it is needless to say that it may be disposed at the upper or lower end of the spool chamber D, rather than the cartridge chamber C.

The cartridge for the film used in the embodiment is $\phi = 24.6$ (mm), which is defined by JIS (Japanese Industrial Standard; $24.0 < \phi < 25.3$). Substitution of this value in Condition (2) yields (3) $19.7 < l < 49.2$ Hence, the finder section of the embodiment will have the arrangement in which the distance l from the last reflecting surface 13b to the eyepiece 14 satisfies Condition (3).

Also, although, in the embodiment, the optical system comprised of the prisms 12 and 13 is used as the image inverting optical system, any other arrangement can be used if the optical axis of incidence lies between the ends of the cartridge chamber C and the arrangement combining a plurality of mirrors, without using any prism, may well be employed.

What is claimed is:

1. A photographic camera, comprising:
    a photographing objective optical system forming an image of an object on a film;
    a cartridge chamber for housing a cartridge in which the film is incorporated;
    a spool chamber for taking up the film; and
    an eye-level real image mode finder including:
        a finder objective optical system having an optical axis different from that of said photographing objective optical system, disposed so that said cartridge chamber is located on an extension of the optical axis of said finder objective optical system;
        a reflecting member erecting an image formed by said finder objective optical system, disposed so that the optical axis of said finder objective optical system is bent and passes over said cartridge chamber; and
        an eyepiece disposed on the optical axis passing over said cartridge chamber.

2. A photographic camera, comprising:
    a photographing objective optical system forming an image of an object on a film;
    a cartridge chamber for housing a cartridge in which the film is incorporated;
    a spool chamber for taking up the film; and
    an eye-level real image mode finder including:
        a finder objective optical system having an optical axis different from that of said photographing objective optical system, disposed so that said spool chamber is located on an extension of the optical axis of said finder objective optical system;
        a reflecting member erecting an image formed by said finder objective optical system, disposed so that the optical axis of said finder objective optical system is bent and passes over said spool chamber; and
        an eyepiece disposed on the optical axis passing over said spool chamber.

3. The photographic camera according to claims 1 or 2, wherein the optical axis of said finder objective optical system is substantially parallel with that of said eyepiece.

4. The photographic camera according to claims 1 or 2, satisfying conditions:

$h_2 < h_1$ $h_3 < h_1$ where $h_1$ is the total length between the ends of one of the cartridge chamber and the spool chamber, $h_2$ is the distance from the optical axis of incidence to the one end of one of the cartridge chamber and the spool chamber, $h_3$ is the distance from the optical axis of incidence to the other end of one of the cartridge chamber and the spool chamber.

5. The photographic camera according to claims 1 or 2, wherein said reflecting member has at least two reflecting surfaces.

6. The photographic camera according to claim 5, wherein at least one of said reflecting surfaces includes a prism.

7. The photographic camera according to claims 1 or 2, further satisfying the condition:

$0.8\phi < l < 2\phi$ where $\phi$ is the diameter of one of the cartridge chamber and the spool chamber and l is the distance from the last reflecting surface of the reflecting member to the eyepiece.

8. A photographic camera, comprising:
    a photographing objective optical system forming an image of an object on a film;
    a cartridge chamber for housing a cartridge in which the film is incorporated;
    a spool chamber for taking up the film; and
    an eye-level real image mode finder including:
        a finder objective optical system having an optical axis different from that of said photographing objective optical system, disposed so that one of said cartridge chamber and said spool chamber is located on an extension of the optical axis of said finder objective optical system;
        a reflecting member erecting an image formed by said finder objective optical system; and
        an eyepiece.

* * * * *